United States Patent
Della-Libera et al.

(10) Patent No.: US 6,839,716 B1
(45) Date of Patent: Jan. 4, 2005

(54) METHOD AND SYSTEM FOR BUILDING A DATASET

(75) Inventors: Giovanni M. Della-Libera, Seattle, WA (US); Patrick M. Dengler, Redmond, WA (US); Anders Hejlsberg, Seattle, WA (US); Bradford H. Lovering, Seattle, WA (US); John P. Shewchuk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 95 days.

(21) Appl. No.: 09/734,265

(22) Filed: Dec. 11, 2000

(51) Int. Cl.$^7$ .............................................. G06F 17/30
(52) U.S. Cl. ..................................... 707/103 R; 707/6
(58) Field of Search .............................. 707/100, 103, 707/3, 200, 6; 709/203

(56) References Cited

U.S. PATENT DOCUMENTS

| | | | |
|---|---|---|---|
| 5,864,858 A | * | 1/1999 | Matsumoto et al. ........ 707/100 |
| 6,014,670 A | * | 1/2000 | Zamanian et al. .......... 707/101 |
| 6,161,103 A | * | 12/2000 | Rauer et al. .................... 707/1 |
| 6,411,922 B1 | * | 6/2002 | Clark et al. .................... 703/2 |

* cited by examiner

*Primary Examiner*—Diane D. Mizrahi
(74) *Attorney, Agent, or Firm*—Merchant & Gould P.C.

(57) ABSTRACT

A method of building a dataset in a computing system includes extracting data meeting a predetermined criteria from at least a first database, filling the dataset with data items, extracting from the first database relationships between the data items meeting the predetermined criteria, and filling the dataset with the relationships. A system for building a dataset in a computing system includes a data extraction module, a data populating module, a relationship extraction module, and a relationship populating module. The data extraction module extracts data meeting a predetermined criteria from at least a first database. The data populating module fills the dataset with data items. The relationship extraction module extracts from the first database relationships between the data items meeting the predetermined criteria. The relationship populating module fills the dataset with the relationships. A dataset contained within memory of a computing system includes a table component for containing data extracted from a database. The dataset also includes a relations component for containing relationships extracted from the database.

37 Claims, 5 Drawing Sheets

METHOD AND SYSTEM FOR BUILDING A DATASET

TECHNICAL FIELD

The present invention relates to datasets and more particularly to retrieving and using datasets from a database.

BACKGROUND

In some instances, data within databases is organized hierarchically or in a tree-like structure. A root data item might contain several children data items. One or more of the children data items contains sub-children data items. For example, a University has several courses. Each course has a professor and a student list. The data is organized in a hierarchy. The root node is the University. The University node contains a first course and a second course. The first course contains a first professor and first and second students. The second course contains a second professor and third and fourth students. Such a hierarchically organized database has disadvantages. One disadvantage is that the entire hierarchy must be parsed to get to the relevant data. For example, if a user wanted to find a list of the students at the University, the system would parse each course to extract the students enrolled in each course. Another disadvantage is that the number of relationships between data items is limited. For example, a user cannot determine which courses a student is enrolled in without parsing each course individually and searching for that student.

In other instances, data within databases is organized by relationships in a relational database. Any number of data items might exist and have any number of relationships, or pointers, to other data items. Using the above example, the second course would have a relationship to the first course. The first professor would have a relationship to the first course and to the second professor. In addition, in this relational database, the first and second students might have relationships to the third and fourth students.

Typically, data is extracted from the relational database and constructed in a hierarchical data model. For example, the above data items would be extracted and a hierarchy formed which includes the first and second courses having the first and second professors, respectively. Such programming methodologies have disadvantages. One such disadvantage is that if a user requests additional information, such as what courses a student is enrolled in, the system must now query the database for the additional information.

SUMMARY

In one aspect of the present invention, a method of building a dataset in a computing system is provided. The method includes extracting data meeting a predetermined criteria from at least a first database, filling the dataset with data items, extracting from the first database relationships between the data items meeting the predetermined criteria, and filling the dataset with the relationships.

In another aspect, a computer program product readable by a computing system and encoding instructions for a computer process for populating a dataset in a computing system is provided. The computer process is analogous to the method described above.

In another aspect, a propagated data signal having computer-executable instructions for populating a dataset in a computing system embodied thereon is provided. The computer-executable instructions are analogous to the method described above.

Another aspect of the present invention includes a system for building a dataset in a computing system. The system includes a data extraction module, a data populating module, a relationship extraction module, and a relationship populating module. The data extraction module extracts data meeting a predetermined criteria from at least a first database. The data populating module fills the dataset with data items. The relationship extraction module extracts from the first database relationships between the data items meeting the predetermined criteria. The relationship populating module fills the dataset with the relationships.

In another aspect, a dataset contained within memory of a computing system is provided. The dataset includes a table component for containing data extracted from a database. The dataset also includes a relations component for containing relationships extracted from the database.

A more complete appreciation of the present invention and its scope may be obtained from the accompanying drawings, that are briefly described below, from the following detailed descriptions of presently preferred embodiments of the invention and from the appended claims.

DETAILED DESCRIPTION

In the following description of preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

Figure 1:
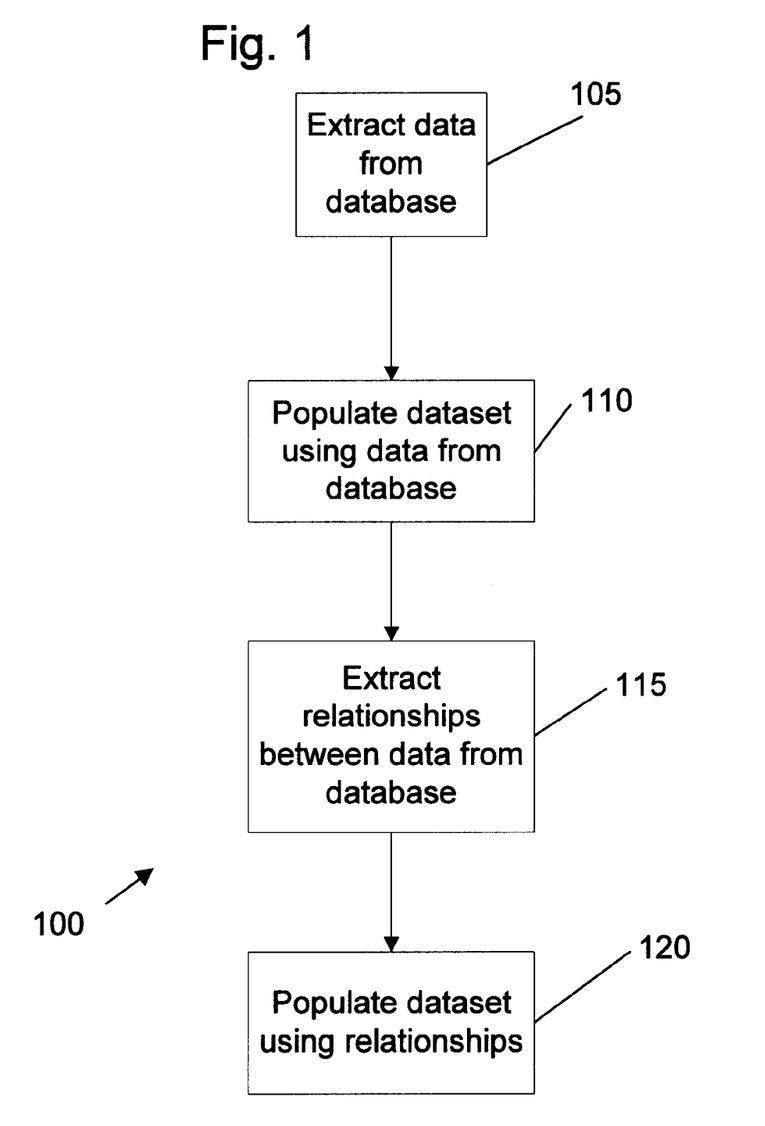
FIG. 1 is a schematic representation of methods and systems for building a database, according to an example embodiment of the present invention.

In general, the present disclosure describes methods and systems for extracting data from databases and populating a dataset representing the extracted data. By the term "populating," it is meant that a dataset is created, or built in the memory of a computing system, and filled with data from a database. The methods and systems include extracting relationships between data along with the data from the database. Referring now to FIG. 1, a dataset system 100 for populating a dataset is illustrated. A first extract module 105 extracts data from the database 105. The database includes a plurality of data and relationships, or pointers, between the data. Preferably, the first extract module 105 extracts data from the database that meets a predetermined criteria. A first populate module 110 populates a dataset using the data retrieved from the database. The populate module 110 builds a dataset in the memory of a computing system and fills the dataset with the data extracted by the first extract module 105.

A second extract module 115 extracts the relationships between the data from the database. The database includes a plurality of relationships between the data. The second extract module 115 extracts the relationships for the data extracted by the first extract module 105. A second populate module 120 populates the dataset with the relationships retrieved from the database. Similar to the first populate module 110, the second populate module 120 fills the dataset with the relationships extracted by the second extract module 115.

Figure 2:
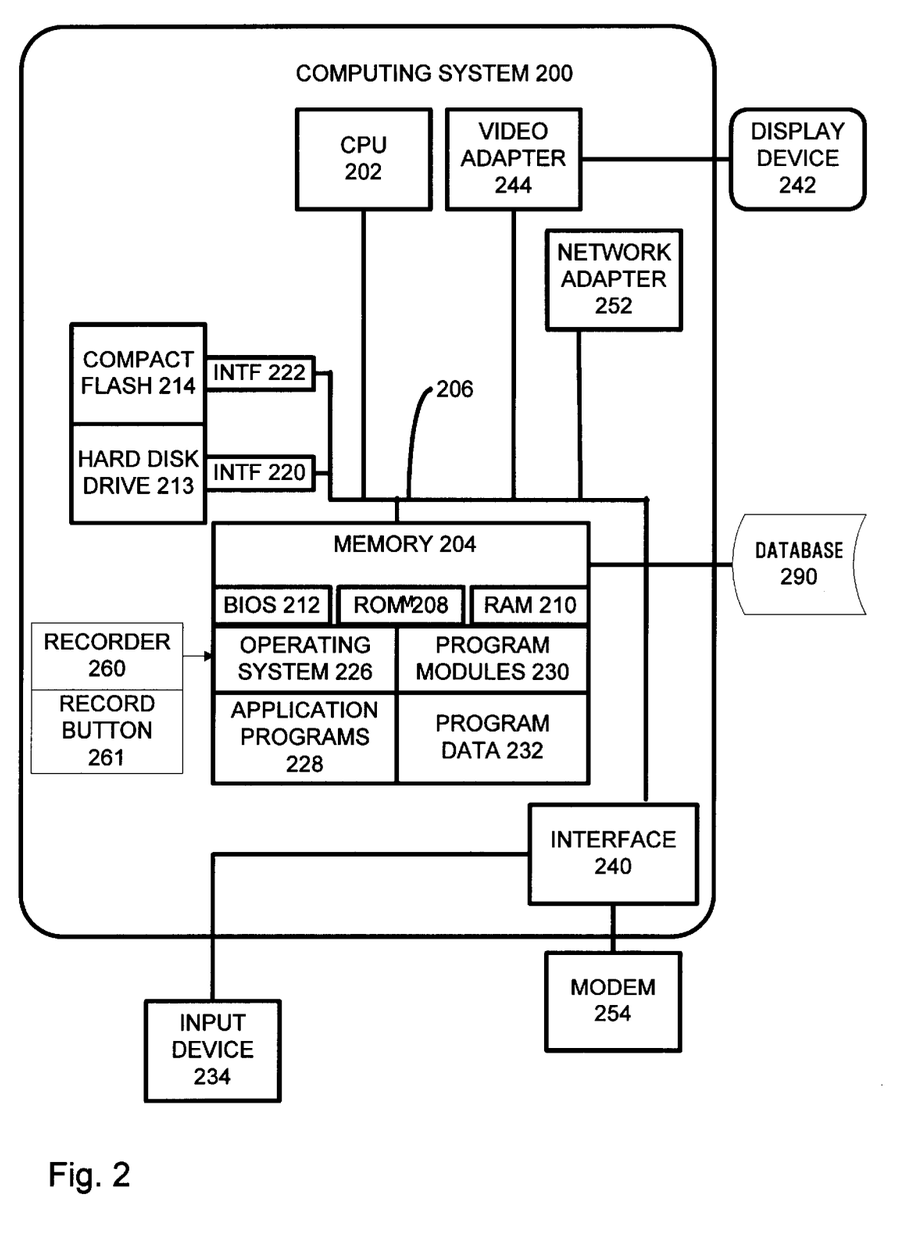
FIG. 2 is a schematic representation of a computing system that may be used to implement aspects of the present invention.

Referring now to FIG. 2, an exemplary environment for implementing embodiments of the present invention includes a general purpose computing device in the form of a computing system 200, such as a handheld or palm-sized computer, including at least one processing system 202. A variety of processing units are available from a variety of manufacturers, for example, Intel or Advanced Micro Devices. The computing system 200 also includes a system memory 204, and a system bus 206 that couples various system components including the system memory 204 to the processing unit 202. The system bus 206 might be any of several types of bus structures including a memory bus, or memory controller; a peripheral bus; and a local bus using any of a variety of bus architectures.

Preferably, the system memory 204 includes read only memory (ROM) 208 and random access memory (RAM) 210. A basic input/output system 212 (BIOS), containing the basic routines that help transfer information between elements within the computing system 200, such as during start-up, is typically stored in the ROM 208.

Preferably, the computing system 200 further includes a secondary storage device 213, such as a hard disk drive, for reading from and writing to a hard disk (not shown), and a compact flash card 214.

The hard disk drive 213 and compact flash card 214 are connected to the system bus 206 by a hard disk drive interface 220 and a compact flash card interface 222, respectively. The drives and cards and their associated computer-readable media provide nonvolatile storage of computer readable instructions, data structures, program modules and other data for the computing system 200.

Although the exemplary environment described herein employs a hard disk drive 213 and a compact flash card 214, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk 213, compact flash card 214, ROM 208, or RAM 210, including an operating system 226, one or more application programs 228, other program modules 230, and program data 232. A user may enter commands and information into the computing system 200 through an input device 234. Examples of input devices might include a keyboard, mouse, microphone, joystick, game pad, satellite dish, scanner, and a telephone. These and other input devices are often connected to the processing unit 202 through an interface 240 that is coupled to the system bus 206. These input devices also might be connected by any number of interfaces, such as a parallel port, serial port, game port, or a universal serial bus (USB). A display device 242, such as a monitor, is also connected to the system bus 206 via an interface, such as a video adapter 244. The display device 242 might be internal or external. In addition to the display device 242, computing systems, in general, typically include other peripheral devices (not shown), such as speakers, printers, and palm devices.

When used in a LAN networking environment, the computing system 200 is connected to the local network through a network interface or adapter 252. When used in a WAN networking environment, such as the Internet, the computing system 200 typically includes a modem 254 or other means, such as a direct connection, for establishing communications over the wide area network. The modem 254, which can be internal or external, is connected to the system bus 206 via the interface 240. In a networked environment, program modules depicted relative to the computing system 200, or portions thereof, may be stored in a remote memory storage device. It will be appreciated that the network connections shown are exemplary and other means of establishing a communications link between the computing systems may be used.

The computing system 200 might also include a recorder 260 connected to the memory 204. The recorder 260 includes a microphone for receiving sound input and is in communication with the memory 204 for buffering and storing the sound input. Preferably, the recorder 260 also includes a record button 261 for activating the microphone and communicating the sound input to the memory 204.

Preferably, a database 290 is connected to the computing system 200.

The database 290 might be a part of the computing system 200 or it might be part of a separate computing system or storage device having several computing systems sharing or interacting with the database 290 simultaneously. The database 290 could be any type of database, for example, a hierarchical database or a relational database.

Figure 3:
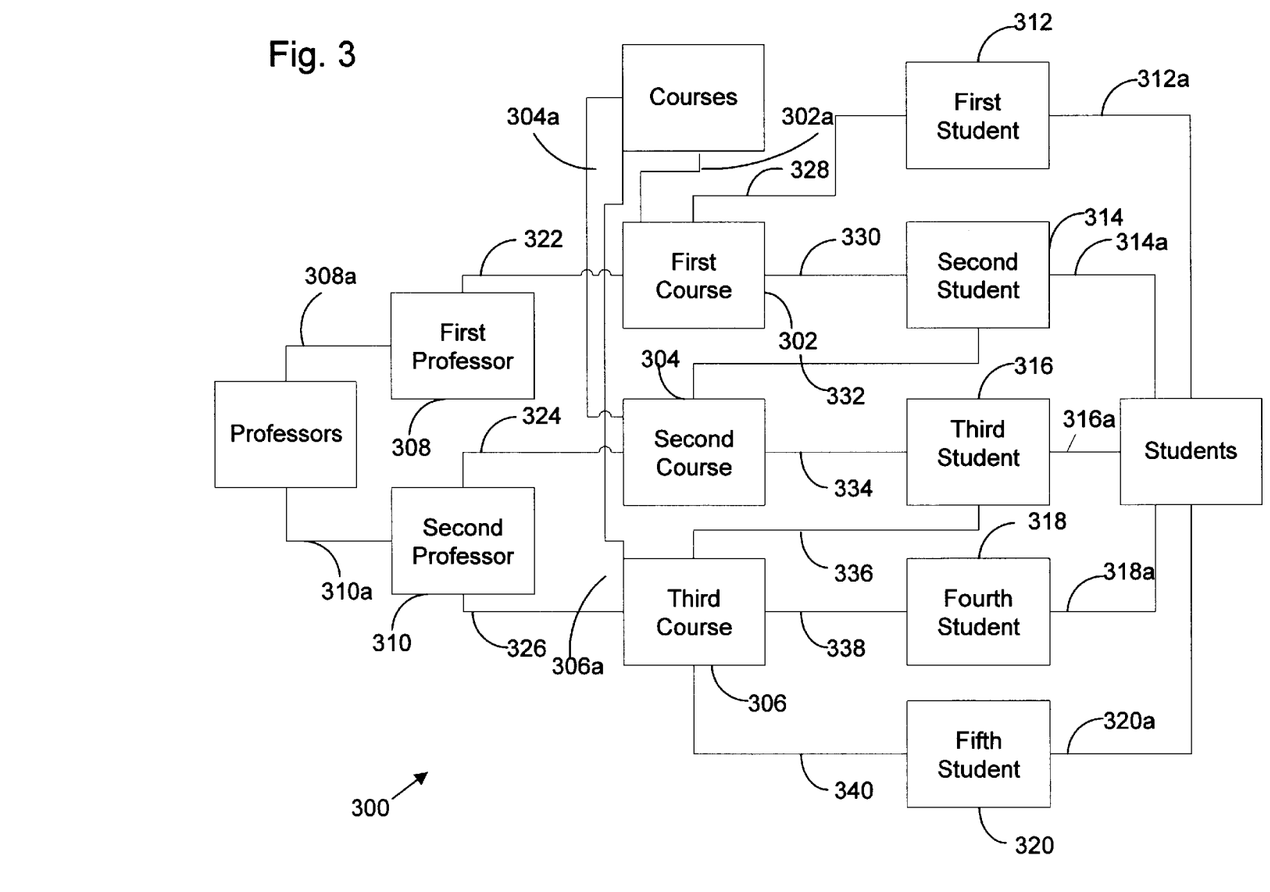
FIG. 3 is a schematic representation of a database, according to an example embodiment of the present invention.

FIG. 3 is a schematic representation of exemplary data contained within an example relational database 300. The database 300 includes a first course 302, a second course 304, and a third course 306 as data items. The first, second, and third courses 302, 304, 306 have relationships 302a, 304a, 306a to each other as courses. The database 300 also includes first and second professors 308, 310. The first and second professors 308, 310 have relationships 308a, 310a to each other as professors. The database 300 also includes first, second, third, fourth, and fifth students 312, 314, 316, 318, 320. The students 312, 314, 316, 318, 320 have relationships 312a, 314a, 316a, 318a, 320a to each other as students.

In addition, the first professor 308 teaches the first course 302 and has a corresponding relationship 322. The second professor 310 teaches the second and third courses 304, 306 and has corresponding relationships 324, 326. The first and second students 312, 314 are enrolled in the first course 302 and have relationships 328, 330. The second student is also enrolled in the second course 304 and has a relationship 332. The third student is enrolled in the second course 304 and has a relationship 334. The third, fourth, and fifth students 316, 318, 320 are enrolled in the third course 306 and have corresponding relationships 336, 338, 340.

In traditional programming methodologies, a system would extract data items from the relationship database 300 and store the data items in a dataset in a hierarchy. By the term "dataset," it is meant a temporary database constructed in the memory of a computing system. The system organizes the hierarchy based on the query from the user. If a user wanted to know the students enrolled in the first and second courses 302, 304, the system would extract the first and second courses 302, 304 and the first, second, and third students 312, 314, 316 from the database 300. The system 300 would arrange the dataset in a hierarchy having a university root node with first and second course children 302, 304. The first course 302 would have children first student 312 and second student 314, and the second course 304 would have children second student 314 and third student 316. If the user now wanted to see what courses the second student 314 was enrolled in, the system would again query the database 300 and build a new hierarchy having the second student 314 as a parent and the first and second courses 302, 304 as children.

In contrast, in the present system, not only are the data items extracted, but the relationships among the data items is also extracted and built into the dataset. In particular, the dataset constructed from the database, and typically stored in the memory of the computing system, includes the data items, the relationships among the data items, and constraints. When a user makes a query, the system extracts the data and relationships from the database associated with that query and populates the data and relationships into the dataset.

For example, if the user wanted to know what courses are offered at the university, the system would extract all of the courses from the database into the dataset. In addition, the system would extract all of the relationships for the courses into the dataset. The system will also extract all related data to the data already extracted and their respective relationships. Thus, a single query to the database enables the system to build a mini-database, or dataset, in the memory the computing system that is a mirror image of a subset of the relational database.

Figure 4:
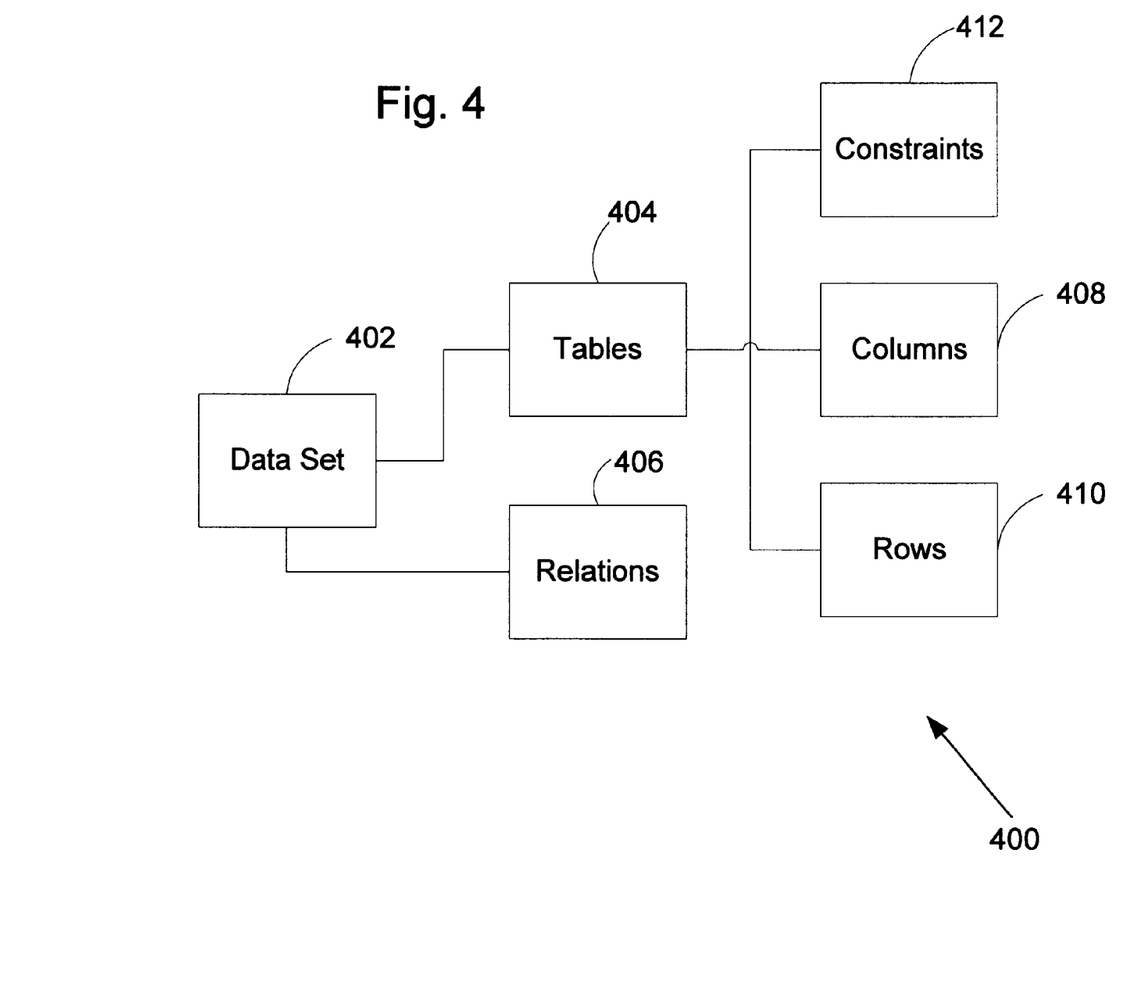
FIG. 4 is a schematic representation of a dataset, according to an example embodiment of the present invention.

FIG. 4 is a schematic representation of a schema 400 for a dataset 402 according to the present disclosure. The dataset 402 is a container of information or data held within the memory of a computing system, such as the computing system 200 of FIG. 2. The dataset 402 contains any number of tables 404 and relations 406. The relations 406 are pointers between data items contained within the tables 404. The tables 404 contain any number of columns 408 and rows 410. In addition the tables 404 include an array of constraints 412. When data, such as the data represented in FIG. 3, is extracted from a database and read into the memory of the computing system, the data is populated into the dataset 402 using the tables 404. The relations between the data within the database are also extracted and populated into the relations 406.

In one example embodiment, the system builds the dataset according to the programming model used and the data being populated. Interactively building the dataset in this fashion allows flexibility for different data types and for different applications of the data. In another example embodiment, the system uses a pre-built, or cooked, schema, or dataset, and populates that pre-built dataset with the data extracted from the database. Pre-built schemas, or cooked schemas, allow the programmer to control the dataset structure. In addition cooked schemas save computing time because the system does not need to build the schema each time the program is executed. Cooked schemas work well, for example, in applications that have repeating data types or repeating applications of the data.

Figure 5:
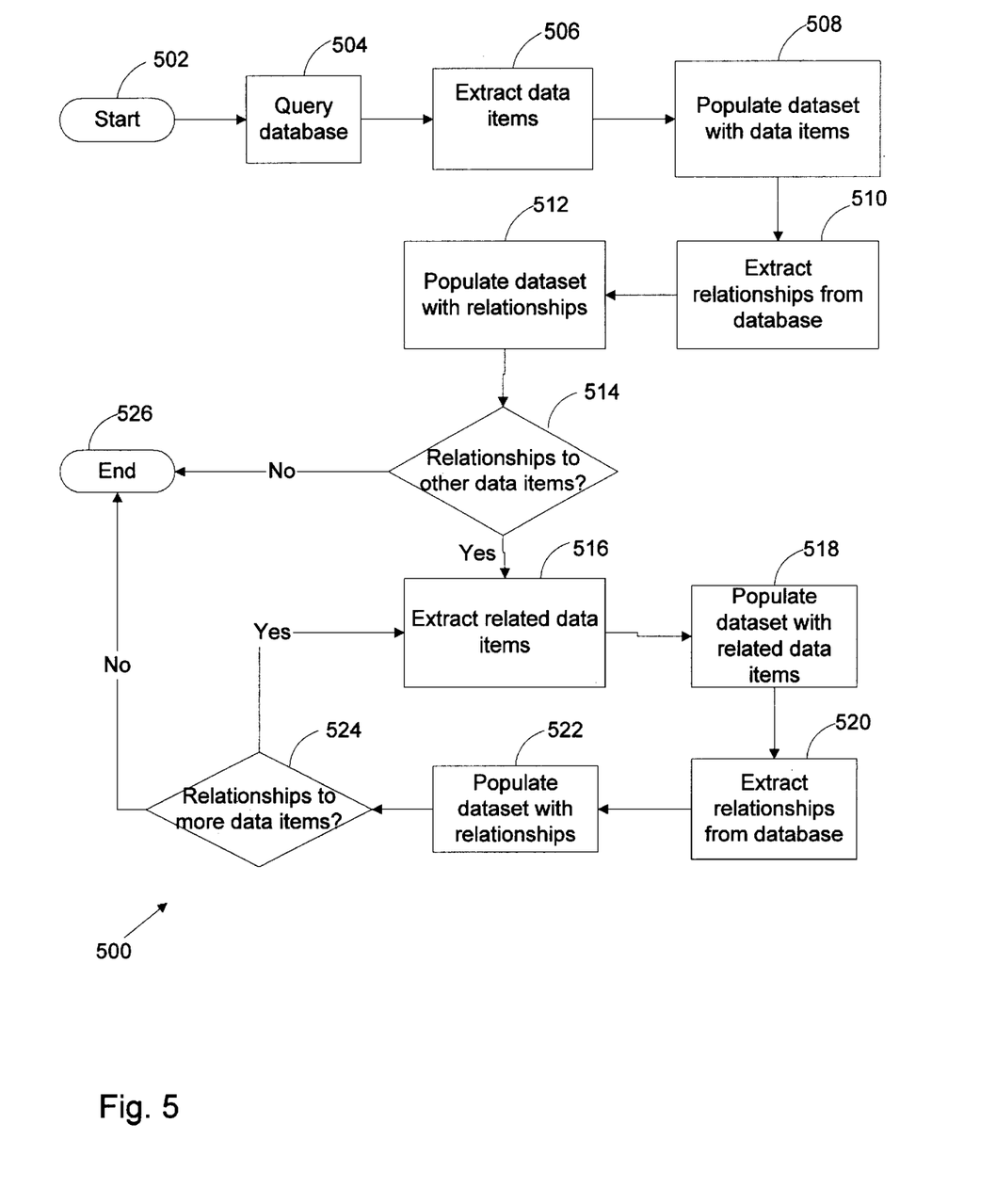
FIG. 5 is a flow chart illustrating the logical operations of the methods and systems of FIG. 1.

FIG. 5 is a flow chart representing logical operations of a dataset building system 500 for building a dataset, such as the dataset 402 of FIG. 4, from a database, such as the database 300 of FIG. 3. Of course, the dataset building system 500 can be used with either hierarchal or relational databases. The dataset building system 500 can also be used with different types of databases, simultaneously, and populates the dataset using adapters to convert the data from the different databases.

Entrance to the operational flow of the dataset building system 500 begins at a flow connection 502. A query module 504 queries the database for information being requested by a user. A data extraction operation 506 extracts the relevant data, or data meeting the query criteria, from the database. A data populate operation 508 populates the dataset with the relevant data items extracted by the data extraction operation 506. By the term "populates," it is meant that a dataset is created, or built, in the memory of a computing system and filled with data from the database. By the term "dataset," it is meant a temporary database constructed in the memory of a computing system. A relationship extraction operation 510 extracts the relationships between the data items extracted by the data extraction operation 506 from the database. A relationship populate operation 512 populates the dataset with the data item relationships extracted by the relationship extraction operation 510.

A related test module 514 detects whether the data items, extracted by the data extraction operation 506, have relationships to other data items. The related test module 514 searches the database for the data items related by the relationships extracted by the relationship extraction operation 510. If the data items have relationships to other data items, the operational flow branches "YES" to a data extraction operation 516. The data extraction operation 516 extracts these related data items from the database. A data populate operation 518 populates the dataset with the related data items extracted by the data extraction operation 516. A relationship extraction operation 520 extracts the relationships of the related data items, similar to the relationship extraction operation 510. A relationship populate operation 522 populates the dataset with the relationships of the related data items.

A related test module 524 detects whether the related data items, extracted by the extraction operation 516, have relationships to more data items. If the related data items have relationships to more data items, the operational flow branches "YES" to the extraction operation 516. Operational flow proceeds recursively as previously described, until new related data items do not have relationships to more data items. When this condition is detected by the related test module 524, the operational flow branches "NO," and operational flow ends at flow termination 526. Likewise, referring back to the related test operation 514, if the initial data items do not have relationships to other data items, the operational flow branches "NO," and operational flow ends at flow termination 526.

The operational flow chart depicted in FIG. 5 may best be understood in terms of application examples. Referring to FIGS. 3, 4, and 5, in a first application example, the query module 504 queries the database 300 for the courses at the university. The first data extraction operation 506 extracts the first course 302, the second course 304, and the third course 306 from the database 300. The first data populate operation 508 populates the dataset 400 with the first course 302, the second course 304, and the third course 306. In particular, the data is stored as rows 410 of the tables 404 of the dataset 400.

The initial relationship extraction operation 510 extracts the initial (or primary) relationships 302a, 304a, 306a from the database 300. Primary relationships meet the criteria of the query. The relationship populate operation 512 populates the dataset 400 with the initial relationships 302a, 304a, 306a. In particular, the relationships 302a, 304a, 306a are placed in the relations 406 portion of the dataset 400.

The related test module 514 detects whether the courses 302, 304, 306 have secondary relationships to other data items in the database. The operational flow branches "YES" to the second data extraction operation 516. The data extraction operation 516 extracts the first student 312, second student 314, third student 316, fourth student 318, and fifth student 320 from the database 300. In addition, the data extraction operation 516 extracts the first professor 308 and the second professor 310 from the database 300. The data populate operation 518 populates the dataset 400 with the additional data items. The relationship extraction operation 520 extracts the secondary relationships 312a, 314a, 316a, 318a, 320a, 328, 330, 332, 334, 336, 338, 340, 322, 324, 326, 308a, and 310a from the database 300. The relationship populate operation 522 populates the dataset 400 with the secondary relationships.

A related test module 524 detects whether the students 312, 314, 316, 318, 320 or the professors 308, 310 have other related data items. Using the example illustrated in FIG. 3, operational flow branches "NO" to the end termination point 526.

In another application example, the first student 312 might have a social security number (not illustrated). In this example embodiment, the second related module 524 would detect other related data items, and operational flow would branch "YES" to the data extraction operation 516. Operational flow would proceed as described above.

In one example embodiment, the dataset 400 can be built as the dataset building system 500 is executed. The tables 404 and relations 406 would be constructed as necessary to contain the data being extracted. In another example embodiment, the dataset 400 can be cooked. In other words, tables and columns would already be set-up in memory to contain students, professors, and courses. The relations 406 would also be set-up to contain the relations among the student, professors, and courses. Thus, the programmer could rigidly construct the dataset 400 for use by many different users. This allows the programmer to control the dataset construct and to limit what data can be accessed. This saves the user time because the system 500 does not have to use computing time to construct the dataset.

In another example embodiment, the dataset 400 can be populated with data extracted from multiple databases, even databases having different data constructs. For example, a company might have a first database containing customers and a second database containing orders. The data can be extracted from each database into the dataset 400 by using adapters to convert the data to an appropriate form. In addition, the relationships can be formed by identifiers (IDs) or keys. For example, the customers might have ID numbers within the first database. The orders have order numbers and associated customer IDs within the second database. The system 500 can use ID or key matching to create relationships from databases that are not relational.

The logical operations of the various embodiments illustrated herein are implemented (1) as a sequence of computer implemented steps or program modules running on a computing system and/or (2) as interconnected logic circuits or circuit modules within the computing system. The implementation is a matter of choice dependent on the performance requirements of the computing system implementing the invention. Accordingly, the logical operations making up the embodiments of the present invention described herein are referred to variously as operations, steps, engines, or modules.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of building a dataset in the memory of a computing system, the method comprising:
    extracting data from at least a first database;
    filling the dataset with the data;
    inferring relationships associated with the data from the first database; and
    filling the dataset with the relationships;
    whereby the dataset can infer hierarchical schema from relational schema and relational schema from hierarchical schema.

2. A method according to claim 1 wherein:
    extracting data includes extracting data from a relational database.

3. A method according to claim 1 wherein:
    inferring relationships includes extracting ids or keys from the database and constructing relationships based on the ids or keys.

4. A method according to claim 1 wherein:
    extracting data includes extracting data from a plurality of databases.

5. A method according to claim 1 further comprising:
    detecting whether the data have relationships to other data.

6. A method according to claim 5 further comprising:
    after detecting, extracting the other data from the first database and populating the dataset with the other data.

7. A method according to claim 6 further comprising:
    inferring other relationships from the database and populating the dataset with the other relationships.

8. A method according to claim 1 further comprising:
    recursively extracting and populating until all related data and relationships have been extracted and populated in the dataset.

9. A method according to claim 1 wherein:
    populating the dataset includes populating a cooked dataset.

10. A method according to claim 1 wherein:
    populating the dataset includes building a dataset.

11. A method according to claim 10 wherein:
    populating the dataset includes building the dataset to includes a table object and a relations object.

12. A method according to claim 11 wherein:
    populating the dataset includes building the table object to include columns, rows, and constraints.

13. A method of building a dataset in the memory of a computing system, wherein the dataset includes a table object and a relations object, the method comprising:
    extracting data from at least a first database;
    filling the table object of the dataset with the data;
    inferring relationships associated with the data from the first database; and
    filling the relations object of the dataset with the relationships;
    whereby the dataset can infer hierarchical schema from relational schema and relational schema from hierarchical schema.

14. A method according to claim 13 wherein:

extracting data includes extracting data from a relational database.

15. A method according to claim 13 wherein:

inferring relationships includes extracting ids or keys from the database and constructing relationships based on the ids or keys.

16. A method according to claim 13 wherein:

extracting data includes extracting data from a plurality of databases.

17. A method according to claim 13 further comprising:

detecting whether the data have relationships to other data.

18. A method according to claim 17 further comprising:

after detecting, extracting the other data from the first database and populating the table object of the dataset with the other data.

19. A method according to claim 18 further comprising:

inferring other relationships from the database and populating the relations object of the dataset with the other relationships.

20. A method according to claim 13 further comprising:

recursively extracting and populating until all related data and relationships have been extracted and populated in the dataset.

21. A method according to claim 13 wherein:

populating the dataset includes populating a cooked dataset.

22. A method according to claim 13 wherein:

populating the dataset includes building a dataset.

23. A method according to claim 13 wherein:

populating the dataset includes building the table object to include columns, rows, and constraints.

24. A method of building a dataset in the memory of a computing system, wherein the dataset includes a table object, having columns, rows, and constraints, and a relations object, the method comprising:

extracting data from at least a first database;

filling the rows of the dataset with the data;

inferring hierarchical and relational relationships associated with the data from the first database; and filling the relations object of the dataset with the relationships;

whereby the dataset can infer hierarchical schema from relational schema and relational schema from hierarchical schema.

25. A method according to claim 24 wherein:

extracting data includes extracting data from a relational database.

26. A method according to claim 24 wherein:

inferring relationships includes extracting ids or keys from the database and constructing relationships based on the ids or keys.

27. A method according to claim 24 wherein:

extracting data includes extracting data from a plurality of databases.

28. A method according to claim 24 further comprising:

detecting whether the data have relationships to other data.

29. A method according to claim 28 further comprising:

after detecting, extracting the other data from the first database and populating the rows of the dataset with the other data.

30. A method according to claim 29 further comprising:

inferring other hierarchical and relational relationships from the database and populating the relations object of the dataset with the other relationships.

31. A method according to claim 24 further comprising:

recursively extracting and populating until all related data and relationships have been extracted and populated in the dataset.

32. A method according to claim 24 wherein:

populating the dataset includes populating a cooked dataset.

33. A method according to claim 24 wherein:

populating the dataset includes building a dataset.

34. A data schema comprising:

a first object for in memory storage of data; and a second object for in memory storage of relations;

whereby a programming model can navigate against the data schema either hierarchically or relationally.

35. A data schema according to claim 34 wherein:

the first object includes a table object.

36. A data schema according to claim 35 wherein:

the second object includes a relations object.

37. A data schema according to claim 36 wherein:

the table object includes rows, columns, and constraints.

* * * * *